Figure 1:
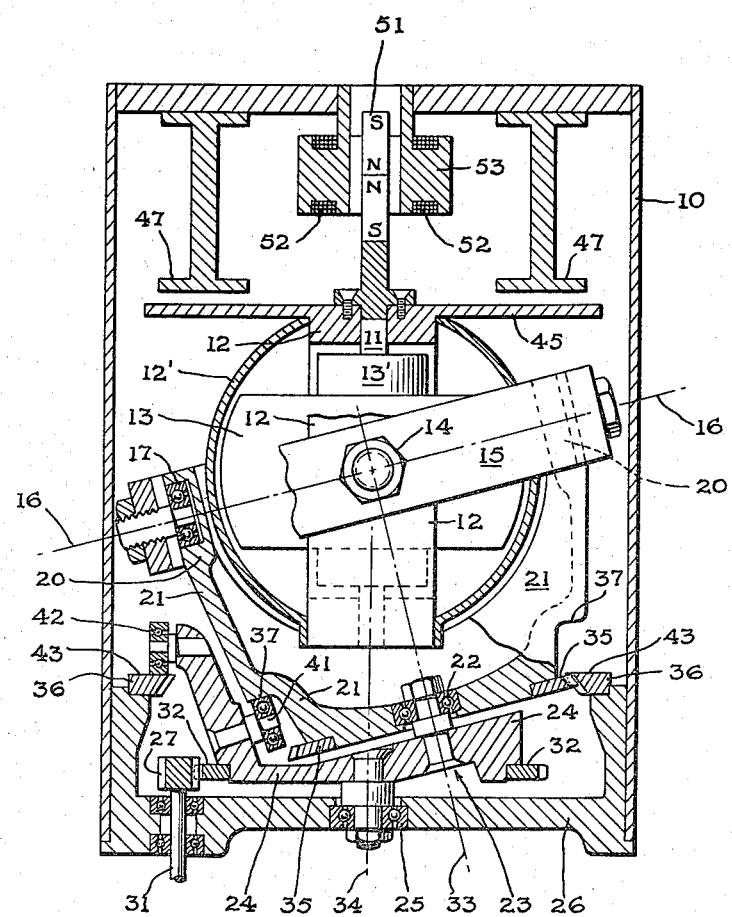

INVENTOR
JEFFERY WALTON BARNES
BY Cameron, Kerkam & Sutton
ATTORNEYS

Feb. 16, 1960  J. W. BARNES  2,924,978
GYROSCOPE APPARATUS
Filed Dec. 12, 1956  3 Sheets-Sheet 3

INVENTOR
JEFFERY WALTON BARNES
BY Cameron, Kerkam & Sutton
ATTORNEYS

United States Patent Office 2,924,978
Patented Feb. 16, 1960

2,924,978
GYROSCOPE APPARATUS

Jeffrey Walton Barnes, Farnborough, England, assignor to Ferranti, Limited, Hollinwood, Lancashire, England, a company of Great Britain and Northern Ireland Application December 12, 1956, Serial No. 627,835

Claims priority, application Great Britain December 14, 1955

12 Claims. (Cl. 74—5)

This invention relates to gyroscope apparatus of the type in which the gyroscope (gyro) is carried by a pair of gimbals and in which in operation a predetermined datum axis of the framework of the apparatus is intended to be maintained in alignment with the spin axis of the gyro.

The invention has particular application where the gimbal bearings are ball bearings and will be described in that connection. It should however be understood that the invention is also applicable where the gimbal bearings are roller bearings or plain pivot bearings.

It is known that the effect of any out-of-balance of a gyro is to cause the spin axis to precess gradually from the desired direction of the datum axis. Where this direction is the vertical, it has been proposed to eliminate such precession by supporting the outer gimbal bearings by a bracket and causing this bracket to rotate about a vertical axis at a steady but low speed throughout the operation of the apparatus, whilst allowing both gimbals freedom of rotation about their own axes. In this known apparatus any deviations of the stabilised equipment from the vertical, as defined by the gyro, are detected by pick-offs and applied to a two-axis servo system to restore the equipment to the vertical.

As a result of this continuous rotation of the supporting bracket, the residual torque due to out-of-balance about either gimbal axis produces merely a small nutation of the spin axis instead of a steady precession.

This known arrangement, though operating satisfactorily to reduce the long-term effects of out-of-balance, is nevertheless unsatisfactory as regards errors contributed by bearing friction.

It will be appreciated from the above description that in the normal operation of the apparatus the gimbal bearings are either static or subjected to a slow oscillation through a very small angle corresponding to the error of the servo system. Frictional measurements made during slow rotation of high-quality ball-bearings when loaded show that (a) the mean friction for one direction of rotation is not in general equal to that for the other direction; and (b) the instantaneous friction is liable to change greatly with small changes of angle.

It follows that a ball bearing which rotates through only a fraction of a degree, as is usually the case with most gyro apparatus of this knid, is likely to be very uncertain in the torque that it will give, and a small departure from the pick-off zero may produce a large change of torque.

An object of the present invention is to provide gyro apparatus of the type stated where the desired direction of the datum axis is any direction, in which long-term errors due to the frictional characteristics of the bearings are to a large extent eliminated.

A further object is to provide gyro apparatus of the type stated where the desired direction of the datum axis is the vertical, in which long-term errors due to out-of-balance of the gyro are also largely eliminated.

In accordance with the present invention, there is provided gyroscope apparatus of the kind in which the gyroscope is carried by a pair of gimbals and in which in operation a predetermined datum axis of the framework of the apparatus is intended to be maintained in alignment with the spin axis of the gyroscope, wherein means are provided for causing each gimbal bearing to oscillate about the gimbal axis and for simultaneously causing the gimbal system as a whole to rotate through at least 360 degrees about the datum axis.

The bearings of the outer gimbal may be supported by a first bracket which itself is supported by a second bracket for a first angular movement with respect to the second bracket about an axis which in operation is out of alignment with both gimbal axes, said second bracket being supported for a second angular movement about said datum axis simultaneously with said first angular movement, and driving means may be provided for effecting both angular movements simultaneously.

The term "bracket" should be understood to include any suitable structure for supporting the bearings of the outer gimbal or of the first bracket, as the case may be, for the angular movements as aforesaid.

The centre of the gimbal system may lie on the axis of the first bracket; in which case this axis may be normal to the datum axis, said first angular movement may be an oscillation, said second angular movement may be a rotation of constant speed and direction, and the plane of the axes of the two brackets may be inclined to each gimbal axis at equal angles which may be 45 degrees.

Pick-off means may be provided responsive to departure of said datum axis from alignment with the spin axis, and servo means adapted to be controlled by said pick-off means so as to restore the datum axis to such alignment.

Said pick-off means may include two coils secured to the inner gimbal and connected to the servo means, and for each coil two induction members individual to the coil and secured to said framework of the apparatus, the two induction members of each coil being adapted to be energised by alternating current to set up fields embracing respectively diametrically opposite parts of the coil, the arrangement being such that in operation any departure of the datum axis from alignment with the spin axis so displaces one or each of said coils in the fields of the associated induction members that the resultant induced electromotive force in the coil or in each coil, as the case may be, is such as to actuate the servo means to restore the datum axis to said alignment.

Torque means may be provided for bringing the spin axis into alignment with the datum axis said means comprising two torque coils secured to the inner gimbal and adapted to be energised by direct current, and for each coil two magnetic members individual to the coil and secured to the framework of the apparatus and arranged to set up constant magnetic fields embracing respectively diametrically opposite parts of the coil, the arrangement being such that on energisation of the torque coils when the spin axis is out of alignment with the datum axis the reaction between one torque coil or each torque coil and the magnetic members sets up a torque or torques, as the case may be, to restore the spin axis to such alignment.

Figure 2:
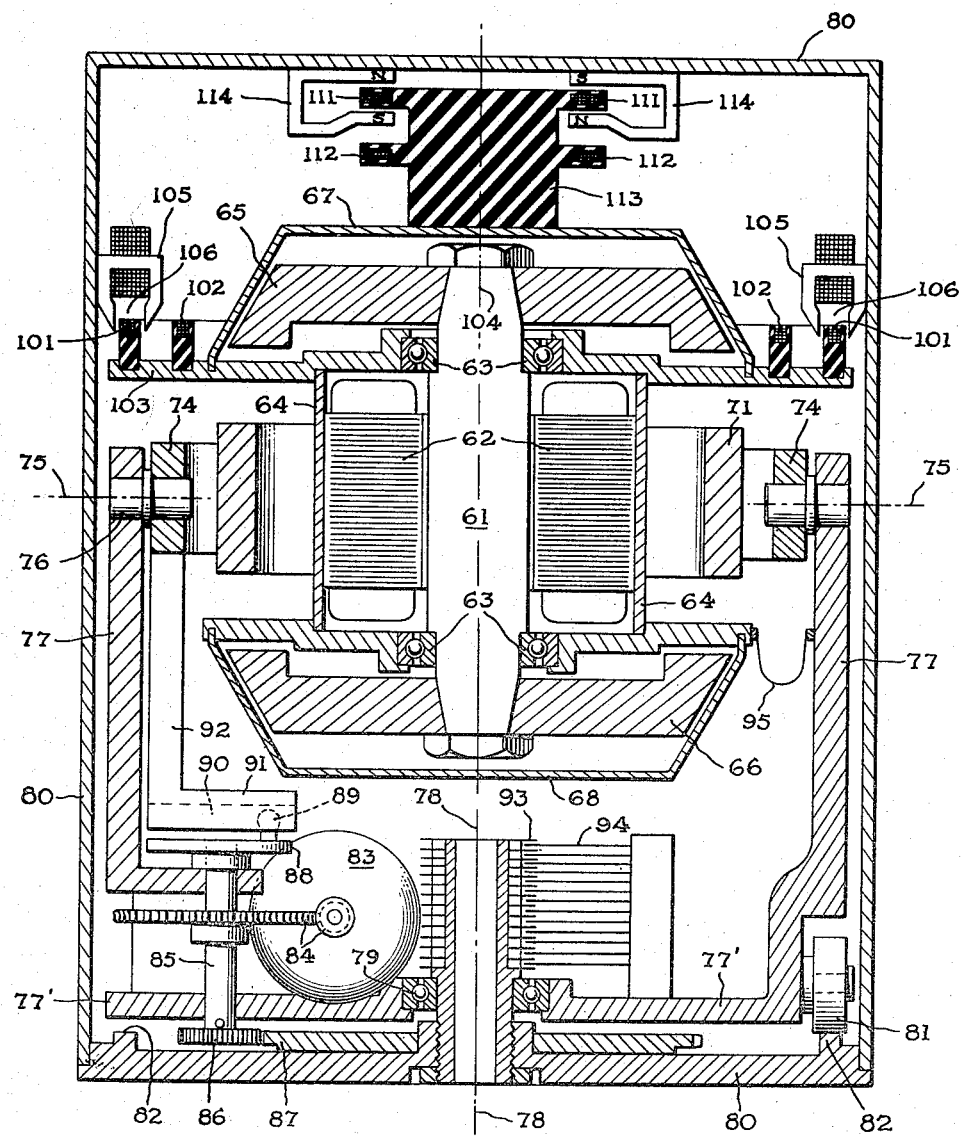
Figure 3:
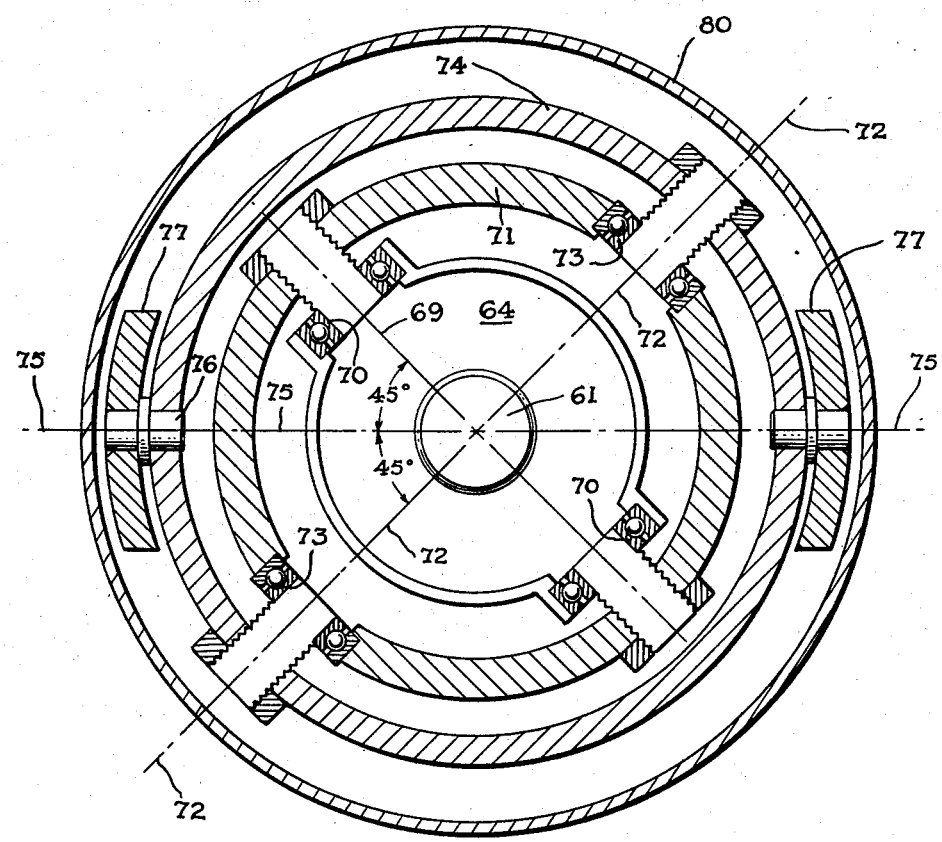

In the accompanying drawings,

Figure 1 shows in sectional elevation, with parts broken away, gyro apparatus in accordance with one embodiment of the invention, Figure 2 shows in sectional elevation another embodiment, and Figure 3 is a mid section in plan of the embodiment of Figure 2.

In carrying out the invention in accordance with this form by way of example, see Fig. 1, gyro apparatus for stabilising about horizontal axes a piece of equipment (not shown) consists of a framework 10 secured to the equipment and containing the rest of the gyro apparatus. This apparatus includes a gyro motor having an inner stator (not shown) which is carried by a fixed shaft 11 from an inner gimbal 12. The rotor 13, which encloses the stator, acts as the gyro proper, and is designed for rotation with the spin axis approximately vertical. A part 13¹ of the rotor houses the bearings on which the rotor is journalled from fixed shaft 11. Gimbal 12 carries a rotor shield 12¹.

Inner gimbal 12 is mounted for rotation about its own axis on ball bearings (one of which is shown at 14) carried by a ring-like outer gimbal 15 the axis of which is indicated at 16. This gimbal is itself mounted on ball bearings, one of which is shown at 17, carried at the ends 20 of a U-shaped first bracket 21. These bearings enable the outer gimbal to rotate freely about its own axis 16 to a limited extent whilst allowing bracket 21 to rotate the gimbal in the manner to be described. The extent of free rotation of the gimbal is of course limited in each direction by the presence of the bracket.

Bracket 21 is centrally pivoted by a ball bearing 22 at its base to an off-centre position 23 on a second bracket 24 which is in effect the planet gear-wheel carrier of a partial epicyclic train. Second bracket 24 is itself pivoted at 25 to a part 26 of frame 10 and arranged to be rotated about that pivot by a pinion 27 secured to a shaft 31 and engaging peripheral teeth 32 of the second bracket, these teeth being concentric with pivot 25.

The pivotal mounting of bracket 21 is inclined to that of second bracket 24, the axis 33 of bracket 21 being inclined to the axis 34 of bracket 24 at an angle of about 10 degrees, the two axes meeting one another at the center of the gimbal system, which therefore lies on both axes. The axis 34 is the datum axis of the apparatus which it is desired to be maintained in alignment with the spin axis i.e. with the vertical.

Bracket 21 is provided with a ring 35 of teeth concentric with axis 33 and acting as the planet gear wheel of the epicyclic train; these teeth engage an annulus 36 secured to frame 10 and concentric with datum axis 34.

To strengthen the rotational support of bracket 21 from bracket 24, an annular surface 37 of bracket 21 is engaged by three ball-bearing rollers, one of which is shown at 41, pivoted to bracket 24.

Similarly, bracket 24 is additionally supported by three ball-bearing rollers, one of which is shown at 42, pivoted to bracket 24 and engaging an anular track 43 secured to frame 10, being formed for convenience on the upper surface of annulus 36.

The epicyclic gear train constituted by components 24, 35, and 36 is described as "partial" since there is no component equivalent to a sun wheel. Alternatively, the teeth 35 could engage a fixed internal sun wheel, the annulus being omitted.

Secured to inner gimbal 12 is a disc 45 the upper surface of which is machined true with the spin axis. This disc forms a common earth capacitor to four equally-spaced pick-off plates, two of which are shown at 47. The arrangement constitutes a two-axis capacity pick-off system such that neither rotation of the gyro about the spin axis nor small horizontal linear movements of the whole gyro give rise to pick-off errors. Pick-off signals are derived only when the datum axis 34 is not aligned with the spin axis; such signals, after suitable amplification and modification, are applied to associated servo motors (not shown) to rotate the equipment about the horizontal axes so as to equalise the capacitances of the condenser pick-offs.

To enable a torque to be applied to the gyro itself, double bar magnets 51 are secured to the top of disc 45 in the field set up by currents passing through four equally spaced coils, two of which are shown at 52, wound on a common former 53. Opposite coils are connected together, providing a torque proportional to the energising current. Measured torques may thus be applied to the gyro about two fixed orthogonal axes even when the gyro is rotating. The magnets 51 are magnetised as shown so as to eliminate any torque due to a uniform external field, such as that of the earth.

Electrical connections from some source of supply are made to the gyro motor by way of two sets of slip-rings (between the two brackets and between the second bracket and the framework) which have been omitted from the drawing for clarity.

In operation, whilst the gyro is spinning, the shaft 31 is steadily rotated at a much slower speed. It will be clear from the above description of the partial epicyclic train that the result of rotating shaft 31 is to cause both brackets to rotate at a constant speed and in a constant direction about their respective axes. Bracket 21 thus causes the outer gimbal to rotate about axis 33, whilst bracket 24 simultaneously causes axis 33 to rotate about datum axis 34 so as to describe an imaginary cone having as the semi-angle the angle between the two axes.

Should the equipment be in such a position that the datum axis is not aligned with the spin axis the capacitive pick-offs derive error signals for corrective action of the servo motors as already indicated, the apparatus functioning in this respect in a familiar manner to stabilise the piece of equipment.

The effect of thus rotating both brackets steadily in a constant direction is twofold:

(a) Over a long period of time the gimbal system as a whole spends equal times in opposite angular positions; the effect of this is to nullify the long-term effects of gravity (or other accelerations) acting along the spin axis on any out-of-balance masses in the gyro about inner or outer gimbal axes.

(b) Each gimbal bearing is oscillated about the gimbal axis, thereby reducing the average friction of the bearing.

The slow oscillation of the gimbal ball-bearings would cause precession of the spin axis towards or away from (depending on spin direction) the predetermined direction at a rate depending on the mean friction of both gimbal axes for both directions of rotation. This last error is largely eliminated, in accordance with the invention, by the rotation of axis 33 about the datum axis 34, the effect being to convert what would otherwise be a precession due to the resultant frictional torque into a small nutation of the spin axis about the predetermined direction.

In the apparatus in accordance with the invention, therefore, the long-term errors due to the out-of-balance of the gyro and the frictional characteristics of the ball bearings are largely eliminated.

The values of the respective angular velocities of bracket 21 about axis 33 and of axis 33 about axis 34 are not very critical. The upper limits are mainly decided by the effects of the inertia of the outer gimbal, which if the gimbal is rotated or oscillated at too high a speed would apply inertia forces to the gyro. The lower limits are such as to avoid the excessive angles of precession of the gyro due to bearing friction and out-of-balance at low speeds. Values of a few revolutions per second are usually suitable. The directions of rotation may be opposite (as in the example described) or the same.

The above-described apparatus may be varied within the scope of the invention. For example, the angle between the axes 33 and 34 need not be 10 degrees; this angle is not particularly critical but for the best results should probably lie within the range 3 to 20 degrees. It is important, however, that axis 33 of the first bracket should never be in alignment with the axis of either gimbal, for if it were, the required oscillation of both gimbal bearings would not result. The desired direction of the datum axis need not necessarily be the vertical; it may for example be a horizontal direction, though in that case the long-term out-of-balance errors are not eliminated. The bracket 21 may be oscillated, rather than rotated, about axis 33. Bracket 24 may be oscillated, rather than rotated, about axis 34, but only through a complete revolution or an integral multiple of complete revolutions.

Another embodiment of the invention, which somewhat simplifies the electrical connections to the gyro and pick-offs, will now be described with reference to Figs. 2 and 3, the main differences between this arrangement and that first described being that the first bracket is now oscillated (instead of being rotated in a constant direction) and its axis is now normal to the datum axis. It is again assumed that the desired direction of the datum axis is the vertical.

The gyro motor is here of the hysteresis kind, including a spindle 61 the central part of which, in register with wound stator poles 62, is of very hard magnetic material and serves as an unwound rotor. The spindle is supported on bearings 63 from the motor frame 64, which again constitutes the inner gimbal. The upper and lower ends of spindle 61 carry heavy flywheels 65 and 66 respectively; these are protected by covers 67 and 68, respectively, secured to the motor frame.

Inner gimbal 64 is mounted for rotation about its own axis 69 in ball bearings 70 (see Fig. 3) carried by the outer gimbal 71 (Figs. 2 and 3).

Gimbal 71 is itself mounted for rotation about its own axis 72 on ball bearings 73 (Fig. 3) carried by a first bracket 74 (Figs. 2 and 3) of ring shape.

Bracket 74 is mounted for rotation about an axis 75 carried by a second bracket 77. Axis 75 passes through the centre of the gimbal system and is normal to the datum axis 78 of the apparatus.

Bracket 77 is roughly of U-shape in section (Fig. 2). It is mounted at the base of the U for rotation about datum axis 78 (which thus acts as the axis of the second bracket) on ball bearings 79 secured to the framework 80 of the apparatus. The arrangement of the brackets is such that the plane of their axes 75 and 78 (which in Fig. 3 is normal to the plane of the diagram, on the line 75) is inclined at 45 degrees to each gimbal axis 69 and 72. To strengthen the rotational support of bracket 77 its base 77¹ is extended in planes normal to the plane of the diagram to form a circular plate; to the periphery of this plate are journalled three rollers, only one of which appears (at 81) in Fig. 2, which engage a circular track 82 on the frame.

To effect the required angular movement of the brackets a small electric motor 83 is mounted on the base 77¹ of the second bracket. By reduction gearing 84 this motor rotates a vertical shaft 85 carrying a pinion 86 which engages a spur wheel 87 secured to the frame coaxial with the datum axis 78. Energisation of the motor therefore causes the second bracket (and with it the motor) to rotate about the datum axis. The speed of the motor is such that this rotation of the bracket is at a rate of a few revolutions per minute.

The oscillation of bracket 74 about the axis 75 is effected by a mechanical linkage between the two brackets. This takes the form of a disc 88 secured to shaft 85 and carrying a ball-ended crank pin 89 which engages in a parallel slot 90 formed in the horizontal end 91 of an approximately vertical arm 92 rigidly attached to bracket 74. Rotation of crank pin 89 about the axis of shaft 85 causes arm 92 and hence bracket 74 to oscillate about axis 75 through a small angle of about ±10 degrees at the same time as the second bracket 77 is rotated about datum axis 78. The respective rates of oscillation and rotation of the two brackets are determined by the same considerations as applied to the arrangement of Fig. 1.

Electrical connections from an outside source of supply are made to motor 83 and to the gyro motor by way of slip-rings 93, secured to frame 80 but within bracket 77, and co-operating brushes 94 secured to that bracket. Connections from the brushes to the gyro are made by way of flexible metal ligaments 95 passing from bracket 77 direct to the inner gimbal, i.e. the gyro stator. The position of the gyro in operation is always near enough to the vertical for these ligaments to exert no appreciable restraint on the gyro movement. It will be appreciated that the ligaments do not partake of the oscillations of the gimbal bearings. This simplified manner of making the connections to the gyro motor results from the fact that in this embodiment the second bracket rotates at the same speed as the inner gimbal, for which reason only one set of slip-rings is required.

In operation, whilst the gyro is spinning, motor 83 rotates second bracket 77 at a constant speed in a constant direction about the datum axis and at the same time oscillates the first bracket 74 about axis 75. The effect of this combined rotation and oscillation of the two brackets is similar to that of the combined rotation of both brackets of the first-described embodiment. In the present arrangement effect (a), referred to above, is brought about by the steady rotation of bracket 77 and effect (b) by the oscillation of bracket 74. It is again important that axis 75 of bracket 74 is never in line with either gimbal axis, for the reason already stated with regard to the embodiment of Fig. 1. This requirement is best ensured if the plane of the bracket axes is inclined to each gimbal axis at 45 degrees.

The long-term errors due to bearing friction and gyro out-of-balance are thereby largely eliminated.

The pick-off means to actuate the associated servo system includes outer and inner coils 101 and 102 respectively (Fig. 2) embedded in insulation and secured to a part 103 of inner gimbal 64 so as to be coaxial with the spin axis 104 of the gyro. Coils 101 and 102 are connected by way of ligaments 95 and slip-rings 93 to servo motors (not shown) for rotating the equipment in planes parallel to that of the diagram and in planes normal to that of the diagram, respectively.

At diametrically opposite parts of coil 101 and on the plane of the diagram are two induction members in the form of electromagnets 105 secured to frame 80 and individual to that coil. This plane will be referred to as a diametral plane since it contains the diameter of coil 101 which connects the two opposite parts of the coil. Clearly this plane also contains the spin axis, since the coil is coaxial with it. Each magnet has an airgap 106 the field across which embraces the adjacent part of coil 101.

Coil 102 is similarly associated with two electromagnets which lie in a diametral plane normal to the plane of the diagram and hence are not visible in the diagram.

Arrangements are made for energising all four magnets by alternating current.

The magnets are so located that when the spin and datum axes are in alignment the appropriate part of each coil lies about half in the associated airgap. The magnets of each coil are energised in such relative sense that under these conditions the two E.M.F.'s induced by them in the associated parts of the coil are in balance and the servo motor connected to that coil is unenergised. Any departure of the datum axis from the spin axis in the diametral plane of the diagram causes one of the two parts of coil 101 to move further into its airgap and the diametrically opposite part to move further out of the other airgap. Clearly the induced E.M.F.'s no longer balance and the servo motor is energised in the sense required to restore the equipment to the vertical. The two diametrically opposite parts of coil 102, on the other hand, are merely tilted slightly in their respective airgaps whilst remaining in the gaps to the same average extent. Consequently no out-of-balance E.M.F. is induced in coil 102.

Similarly if the datum axis departs from the spin axis in the diametral plane normal to the diagram. In this case the out-of-balance E.M.F. is developed in coil 102 instead of in coil 101 and the servo motor connected to coil 102 is energised to effect restoration of the equipment to the vertical.

In practice, of course, a departure of the datum axis from the spin axis will usually be compounded of movements in both planes and each coil and the associated servo motor will be energised in proportion to the resolved extent of departure in the plane associated with them.

The means for applying a torque to the gyro to bring the spin axis into alignment with the datum axis makes use of components somewhat similar to those used in the pick-off system just described. Upper and lower torque coils 111 and 112 (Fig. 2) are embedded in insulation 113 secured to flywheel cover 67 (and hence to the inner gimbal) coaxially with the spin axis. Connections to the coils from outside the frame are made by slip-rings 93 and ligaments 95.

Two diametrically opposite parts of coil 111 in the diametral plane of the diagram lie in the airgap between the poles of permanent magnets (or direct-current energised electromagnets) 114 secured to the frame. Similarly, diametrically opposite parts of coil 112 in the diametral plane normal to that of the diagram lie in the airgaps between the poles of another two magnets, not shown. The arrangement is such that when the spin and datum axes are in alignment the two opposite parts of each coil lie to the same extent within their respective airgaps.

To centralise the gyro when the axes are not in alignment both coils 111 and 112 are energised by direct current. The result is to set up between the coils and the magnetic fields a reaction similar to that in a direct-current motor, with torques acting in each diametral plane tending to bring the gyro into alignment with the datum axis. When the alignment has been effected the supply to the coil is disconnected.

The pick-off and torque systems just described with reference to the embodiment of Fig. 2, and the arrangement of gyro motor and flywheels, may equally be used with the bracket arrangements of Fig. 1.

As in the case of the first-described embodiment, the second bracket may be oscillated rather than rotated, as long as the amplitude of oscillation is one complete revolution or an integral multiple thereof.

It is not essential that the plane of the bracket axes should be at 45 degrees to the gimbal axes as long as the axis of the first bracket is never in alignment with the axis of either gimbal. Nor need the gimbal axes be at 90 degrees to one another. Equality of amplitude of gimbal bearing oscillation could for example be attained by arranging for the plane of the bracket axes to be at 30 degrees to each gimbal axis.

In either of the above-described embodiments it is not essential that the axis of the second bracket should be the datum axis; the second bracket might alternatively rotate about an axis displaced from but parallel to the datum axis, though the described arrangement is usually more convenient.

Though in each of the above embodiments the gimbal bearings are ball bearings, the apparatus functions equally well to correct the long-term bearing errors where these bearings are roller bearings or plain pivot bearings.

What we claim is:

1. Gyroscope apparatus of the type including a framework containing a gyroscope carried by a gimbal system comprising a pair of gimbals and in which in operation a predetermined datum axis of said framework is intended to be maintained in alignment with the spin axis of the gyroscope, wherein means are provided for causing each gimbal bearing to oscillate about its gimbal axis and for simultaneously causing the gimbal system as a whole to rotate through at least 360 degrees about the datum axis.

2. Apparatus as claimed in claim 1 wherein the bearings of the outer gimbal are supported by a first bracket which itself is supported by a second bracket for a first angular movement with respect to the second bracket about an axis which in operation is out of alignment with both gimbal axes, said second bracket being supported for a second angular movement about said datum axis simultaneously with said first angular movement, and driving means are provided for effecting both angular movements simultaneously.

3. Apparatus as claimed in claim 2 where said second angular movement is about the datum axis, wherein the centre of the gimbal system lies on said axis of the first bracket.

4. Apparatus as claimed in claim 3 wherein the axis of the first bracket is normal to the datum axis, said first angular movement is an oscillation, and said second angular movement is a rotation of constant speed and direction.

5. Apparatus as claimed in claim 4 wherein the plane of the axes of the two brackets is inclined to each gimbal axis at equal angles, preferably of 45 degrees.

6. Apparatus as claimed in claim 4 wherein said driving means includes a mechanical linkage between said brackets and a motor for rotating the second bracket, whereby such rotation causes said oscillation of the first bracket.

7. Apparatus as claimed in claim 3 wherein the axis of the first bracket is inclined to the datum axis at an angle other than a right angle, and each of said angular movements is a rotation of constant speed and direction, whereby in operation the axis of the first bracket describes an imaginary cone having said angle as the semi-angle.

8. Apparatus as claimed in claim 7 wherein said driving means includes a partial epicyclic train, the second bracket being in effect a planet carrier wheel and the first bracket being in part a planet wheel carried by said carrier and engaging an annulus secured to said framework, and a motor for rotating the second bracket.

9. Apparatus as claimed in claim 1 wherein pick-off means are provided responsive to departure of said datum axis from alignment with the spin axis, and servo means adapted to be controlled by said pick-off means so as to restore the datum axis to such alignment.

10. Apparatus as claimed in claim 9 wherein said pick-off means includes two coils secured to the inner gimbal and connected to the servo means, and for each coil two induction members individual to the coil and secured to said framework of the apparatus, the two induction members of each coil being adapted to be energised by alternating current to set up fields embracing respectively diametrically opposite parts of the coil, the arrangement being such that in operation any departure of the datum axis from alignment with the spin axis so displaces one or each of said coils in the fields of the associated induction members that the resultant induced electromotive force in the coil or in each coil, as the case may be, is such as to actuate the servo means to restore the datum axis to said alignment.

11. Apparatus as claimed in claim 10 wherein said coils are coaxial with the spin axis, the diametral plane containing the induction members of one coil and the spin axis being normal to the diametral plane containing the induction members of the other coil and the spin axis.

12. Apparatus as claimed in claim 1 wherein torque means are provided for bringing the spin axis into alignment with the datum axis said means comprising two torque coils secured to the inner gimbal and adapted to be energised by direct current, and for each coil two magnetic members individual to the coil and secured to the framework of the apparatus and arranged to set up constant magnetic fields embracing respectively diametrically opposite parts of the coil, the arrangement being such that on energisation of the torque coils when the spin axis is out of alignment with the datum axis the reaction between one torque coil or each torque coil and the magnetic members sets up a torque or torques, as the case may be, to restore the spin axis to such alignment.

References Cited in the file of this patent

UNITED STATES PATENTS

| | | |
|---|---|---|
| 1,942,470 | Bassett | Jan. 9, 1934 |
| 2,124,817 | Fieux | July 26, 1938 |
| 2,417,066 | Douglas | Mar. 11, 1947 |
| 2,435,581 | Greenland | Feb. 10, 1948 |

FOREIGN PATENTS

| | | |
|---|---|---|
| 13,280 | Great Britain | Mar. 13, 1919 |